United States Patent [19]
Kildune

[11] Patent Number: 5,467,708
[45] Date of Patent: Nov. 21, 1995

[54] DIRECT APPLIED EMBOSSING CASTING METHOD

[75] Inventor: Joseph S. Kildune, Salem, N.H.

[73] Assignee: GenCorp Inc., Fairlawn, Ohio

[21] Appl. No.: 404,857

[22] Filed: Mar. 15, 1995

[51] Int. Cl.$^6$ ..................... B31F 1/07
[52] U.S. Cl. ............ 101/32; 101/401.1; 264/294
[58] Field of Search ............... 101/22, 23, 24, 101/25, 28, 32, 401.1; 264/219, 220, 224, 293, 294

[56] References Cited

U.S. PATENT DOCUMENTS

| | | | |
|---|---|---|---|
| 2,019,590 | 11/1935 | Westra | 41/25 |
| 2,218,227 | 10/1940 | Winnek | 18/61 |
| 2,316,143 | 4/1943 | Peebles et al. | 41/25 |
| 2,849,752 | 9/1958 | Leary | 18/10 |
| 3,387,351 | 6/1968 | Roosen | 101/32 |
| 3,551,177 | 12/1970 | Hechtman et al. | 117/11 |
| 3,839,120 | 10/1974 | Killan | 156/245 |
| 3,843,763 | 10/1974 | Coll-Palagos | 264/219 |
| 3,869,535 | 3/1975 | Coll-Palagos | 264/219 |
| 4,017,581 | 4/1977 | Amidon | 264/220 |
| 4,084,500 | 4/1978 | Brown et al. | 101/28 |
| 4,158,073 | 6/1979 | Schneider et al. | 427/195 |
| 4,202,716 | 5/1980 | Roman | 156/79 |
| 4,250,135 | 2/1981 | Orsini | 264/227 |
| 4,608,108 | 8/1986 | Goll | 156/219 |
| 4,609,514 | 9/1986 | Kyle et al. | 264/153 |
| 5,057,258 | 10/1991 | Scuri | 264/138 |
| 5,261,984 | 11/1993 | Minnick et al. | 156/209 |
| 5,327,825 | 7/1994 | Parker et al. | 101/32 |

*Primary Examiner*—Ren Yan
*Attorney, Agent, or Firm*—Robert F. Rywalski; David A. Spenard

[57] ABSTRACT

This invention relates to a method of creating a seamless printing master for use with an embossing roll to ultimately produce a textured wall or floor covering. A hardenable material is applied to the textured surface of a positive printing master. The embossing roll is placed on the positive printing master and then rolled in a forward direction, compressing the hardenable material between the textured surface of the substrate and the outer surface of the embossing roll, until approximately three fourths of the circumference of the embossing roll is covered. The hardenable material is then allowed to harden. A second amount of hardenable material is applied to the portion of the positive printing master which corresponds to the uncovered portion of the embossing roll. The positive printing master section is rotated in the forward direction once again and the second amount of hardenable material is uniformly compressed between the textured surface of the substrate and the remaining uncovered portion of the embossing roll. The second amount of hardenable material is allowed to cure to a hardened state. The positive printing master is then completely removed to exposing a seamless negative printing master formed in hardened material and firmly affixed to the embossing roll. The prepared embossing roll can then be used in a conventional embossing process to create a textured wall or floor covering.

8 Claims, 1 Drawing Sheet

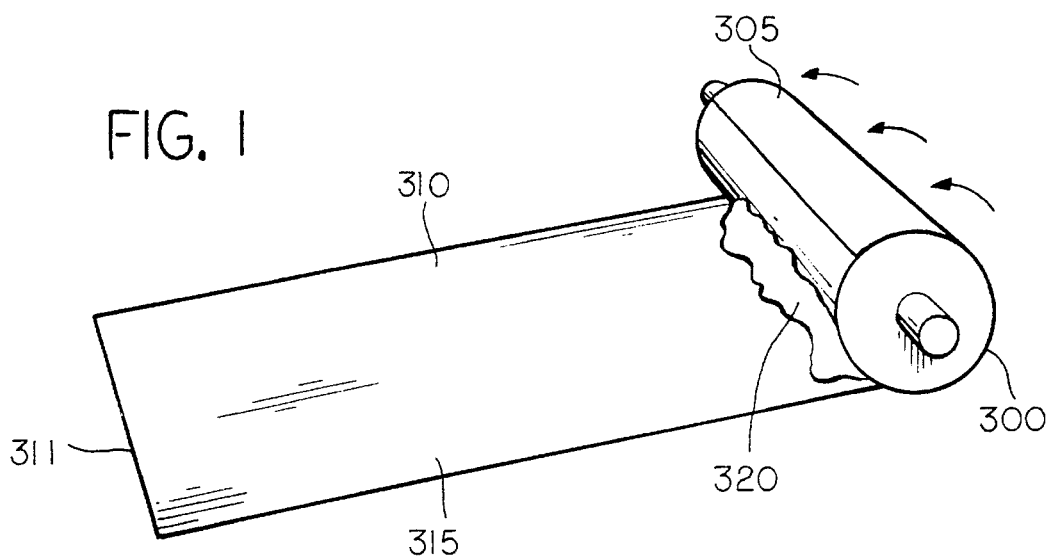
FIG. 1
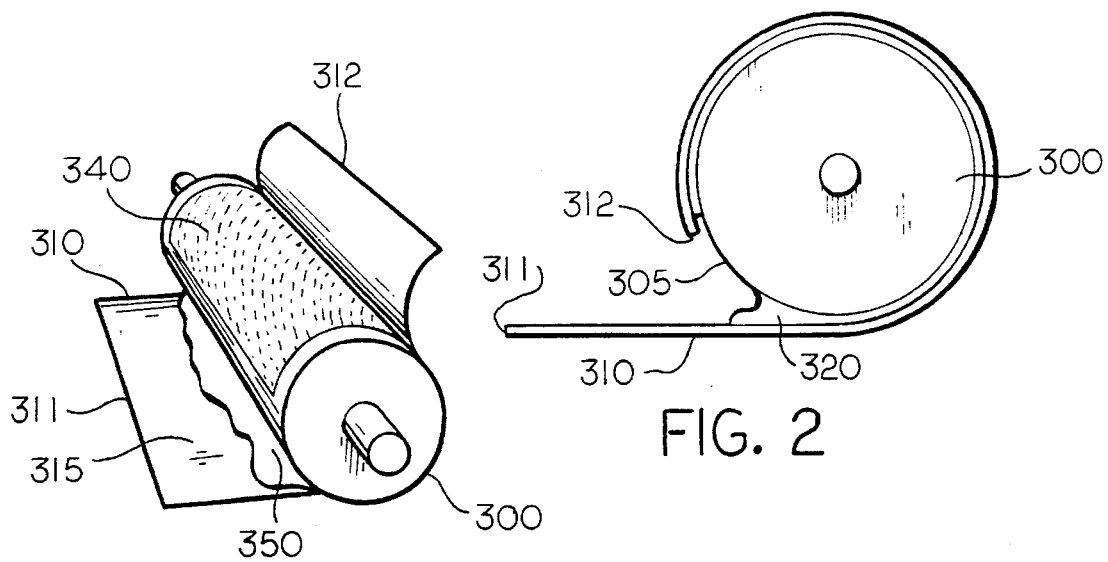
FIG. 2
FIG. 3
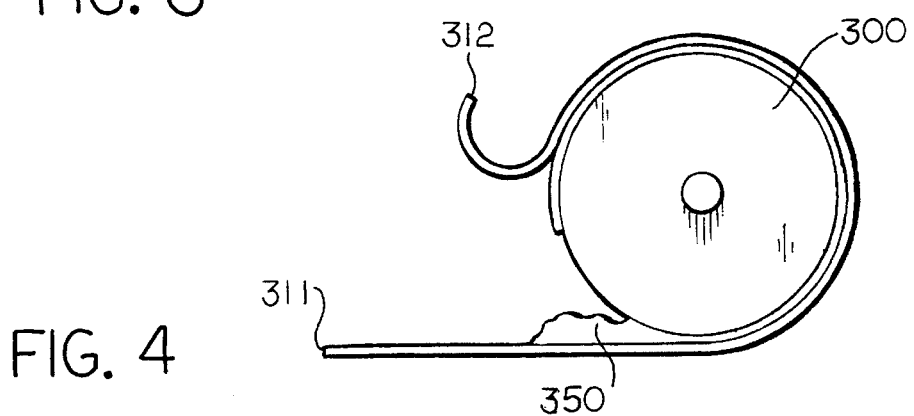
FIG. 4

DIRECT APPLIED EMBOSSING CASTING METHOD

FIELD OF THE INVENTION

The present invention relates to the production of textured wall or floor coverings. More specifically, the present invention relates to a convenient and inexpensive method of creating a quality seamless printing master for use on an embossing roll to imprint sheets of such coverings.

BACKGROUND OF THE INVENTION

In the manufacture of wall and floor coverings, it is sometimes desirable to impart a textured surface thereto in the form of a decorative embossing. One method of attaining such decorative embossing is to employ an embossing roll, usually made of metal, to transfer the desired pattern or texture to the substrate material.

When a metal embossing roll is utilized, there are several methods of imparting the desired design or texture onto the roll. For example, the pattern or texture can be cut into the outer surface of the roll using a machine process (such as die-and-mill) or a chemical process (such as photoetching). Any process, including the two mentioned, which cuts into the outer surface of the embossing roll, is extremely expensive and time consuming. Skilled technicians must be employed to execute the numerous stages required to prepare the roll, which can take months to complete.

Further, such a process is also time consuming and expensive to reverse, making it difficult to reuse the embossing roll. Making a previously cut or etched embossing roll ready for reuse involves either "turning down" the roll (i.e., shaving away the outer surface until the cut areas are eliminated and the outer surface is smooth) or adding material to the roll, so that the cut areas are filled. If the embossing roll is turned down, enough of the roll will eventually be trimmed away so that it will become impossible to reuse the roll.

SUMMARY OF THE INVENTION

The preferred method entails a method of creating a seamless printing master for use with an embossing roll to ultimately produce a textured wall or floor covering. A hardenable material is applied to the textured surface of a positive printing master at the trailing edge. The positive printing master can be one previously created by the artist using conventional methods. The embossing roll is placed on the positive printing master near the trailing edge, and then rolled in a forward direction, towards the leading edge, uniformly compressing the hardenable material between the textured surface of the positive printing master and the outer surface of the embossing roll, until approximately three fourths of the circumference of the embossing roll is covered. The hardenable material is then allowed to harden. The embossing roll is then rotated in the reverse direction and the positive printing master is partially peeled back away from the embossing roll. A second amount of hardenable material is applied to the portion of the positive printing master which corresponds to the uncovered portion of the embossing roll. The positive printing master section is rotated in the forward direction once again and the second amount of hardenable material is uniformly compressed between the textured surface of the positive printing master and the remaining uncovered portion of the embossing roll. The second amount of hardenable is allowed to cure to a hardened state. The positive printing master is then completely removed to expose a negative printing master region which is the negative image of the pattern contained in the positive printing master section, imprinted in hardened material, and firmly adhered to the embossing roll. The result is a seamless negative printing master formed in hardened material and firmly affixed to the embossing roll which can then be used in a conventional embossing process to create a textured wall or floor covering. The hardened material may then be removed from the embossing roll so that the embossing roll can be reused.

The present method offers numerous advantages over the previous methods of creating textured wall and floor coverings using an embossing roll. First, the artist is allowed to have much more creative input into the process. The artist himself actually creates the positive printing master section to be used, as opposed to instructing a technician to prepare the embossing roll using conventional cutting or etching methods. If the artist is not satisfied with the finished negative printing master formed on the outer surface of the embossing roll, he may simply remove the hardened material and start again.

Second, and perhaps more importantly, the instant process allows the metal embossing rolls to be reused virtually indefinitely. When the desired amount of a particular product has been manufactured, it is a simple process to remove the hardened material from the outer surface of the embossing roll and start another production run after creating a new negative printing master (having a different textured surface than the previous run). This eliminates the need to "turn down" the metal embossing roll after each use. By eliminating the process of turning down the embossing roll, the need to dispose of potentially dangerous metal shavings is also eliminated, a concern which is not insignificant in today's environmentally conscious society.

Another advantage of the present method is reduced time to prepare an embossing roll for a production run. Whereas a photoetching or gravure process could take a matter of months, the direct applied embossing casting method takes a matter of weeks. As for expense, the cost of the hardenable material plus the time of the artist to use it is significantly cheaper than the cost of currently used processes plus the time of skilled technicians to implement them.

Accordingly, it is an object of the present invention to provide a new, easy-to-use method of creating a seamless printing master for use on an embossing roll to ultimately produce textured wall or floor coverings.

It is a further object of the present invention to provide a method of creating a seamless printing master which allows the embossing roll to be reused repeatedly.

It is a yet further object of the present invention to provide a method of creating a seamless printing master where the artist has a high degree of creative input into the forming of the positive printing master.

For a further understanding of the present invention and the objects thereof, attention is directed to the drawings and the following brief description thereof, to the detailed description of the preferred embodiment, and to the appended claims.

BRIEF DESCRIPTION OF THE DRAWINGS

FIG. 1 is a perspective view of the embossing roll and positive printing master of the preferred method where the hardenable material is being applied to the positive printing master;

FIG. 2 is an elevational side view of the embossing roll of the preferred method where the embossing roll has been advanced in the forward direction;

FIG. 3 is a perspective view of the embossing roll of FIG. 2 where the positive printing master has been peeled back from the embossing roll and the second amount of hardenable material has been applied to the positive printing master; and, FIG. 4 is an elevational side view of the embossing roll of FIG. 3.

DETAILED DESCRIPTION OF THE PREFERRED EMBODIMENT

First, the artist creates positive printing master 310 having a textured surface 315. This can be accomplished, in the preferred method, by starting with a substrate made of a vinyl material or the like. The substrate may then be heated, stretched, deformed, imprinted, or shaped by any other process to create the desired pattern. The pattern may be symmetrical or not free-form abstract or pictorially representative, being limited only by the imagination of the artist and the physical properties of the substrate material. In short, the artist may use any of a variety of methods to create any desired pattern which ultimately results in positive printing master 310 to be used in conjunction with standard embossing roll 300. With the method disclosed herein, the use of multiple positive printing master sections is not possible. However, if the artist desires a varied pattern to be imparted to the wall or floor covering, he may create different patterns within the single positive printing master so that the overall pattern of the wall or floor covering is varied accordingly. Of course, as an alternative to creating an original positive printing master, the artist may obtain a pre-made one and use it in same way as he would use an original in the method described below.

Once positive printing master 310 has been completed, the artist is ready to prepare embossing roll 300. The artist positions positive printing master 310 on a flat surface, such as a table or workbench. The preferred hardenable material (used in the present method) is Polyester #17 by Ad Tech Co. However, any two-part, high-temperature plastic system could be used in place of the Polyester #17. As shown in FIG. 1, first amount of hardenable material 320 is spread across the width of textured surface 315 of positive printing master section 310 near trailing edge 312 with a spatula or similar device.

Embossing roll 300 is initially positioned near trailing edge 312 of positive printing master 310. Embossing roll 300 is then slowly rotated in a forward direction, that is, towards leading edge 311 of positive printing master 310, so that the first amount of hardenable material 320 is uniformly compressed between textured surface 315 of positive printing master 310 and outer surface 305 of embossing roll 300, until approximately three fourths of the circumference of embossing roll 300 is covered, best shown in FIG. 2. The first amount of hardenable material 320 is then allowed to harden. Embossing roll 300 is then rotated slightly in the reverse direction and the positive printing master 310 is partially peeled back away from outer surface 305 of embossing roll 300, best shown in FIGS. 3 and 4. Because of the inherent physical properties of first amount of hardenable material 120 and the material used for first positive printing master section 310, first amount of hardenable material 320 firmly adheres to outer surface 305 of embossing roll 300, but does not adhere to first positive printing master 310. A second amount of (the same) hardenable material 350 is applied to the portion of positive printing master 310 which corresponds to the uncovered portion of outer surface 305 of embossing roll 300. Embossing roll 300 is again rotated in the forward direction and the second amount of hardenable material 350 is uniformly compressed between the textured surface 315 of positive printing master 310 and the remaining uncovered portion of outer surface 305 of embossing roll 300. The second amount of hardenable material 350 is allowed to cure to a hardened state. Positive printing master 310 is then completely removed from outer surface 305 of embossing roll 300 to expose a seamless negative printing master which is the negative image of the pattern contained in the positive printing master 310 imprinted in the hardened material and firmly adhered to the outer surface 305 of embossing roll 300. The prepared embossing roll 300 can then be used in a conventional embossing process to create a textured wall or floor covering.

When the production run of a specific wall or floor covering is complete, it is a simple process to ready embossing roll 300 for reuse. The hardened material is either stripped from outer surface 305 of embossing roll 300 using a lathe-like device, removed by immersing embossing roll 300 in a solvent bath which dissolves the hardened material, or removed by any equivalent process. Embossing roll 300 is then ready to use again.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A method of creating a seamless printing master for use with an embossing roll, said method comprising the steps of:
   a. applying a first amount of hardenable material (320) to a positive printing master (310), said positive printing master (310) comprising a substrate having a textured surface (315), a leading edge (311), and a trailing edge (312);
   b. positioning said embossing roll (300) upon said positive printing master (310);
   c. advancing said embossing roll (300) by rotating it in a forward direction along the length of said positive printing master (310) such that said first amount of hardenable material (320) is compressed between said textured surface (315) of said positive printing master (310) and the outer surface (305) of said embossing roll (300) until said positive printing master (310) and said first amount of hardenable material (320) cover approximately three-fourths of the circumference of said embossing roll (300), whereby imprinting a pattern upon said first amount of hardenable material (320) as said first amount of hardenable material (320) is compressed between said positive printing master (300) and said outer surface (305) of said embossing roll (300);
   d. hardening said first amount of hardenable material (320);
   e. partially peeling back said positive printing master (300) away from said outer surface (305) of said embossing roll (300) such that a portion of said imprinted hardened material is exposed;
   f. rotating said embossing roll (300) in a rearward direction;

g. applying a second amount of hardenable material (350) to the portion of said positive printing master (300) corresponding to the remaining uncovered portion of said outer surface (305) of said embossing roll (300);

h. advancing said embossing roll (300) by rotating it in said forward direction such that said positive printing master (300) and said second amount of hardenable material (350) cover the remaining one-fourth of the circumference of said embossing roll (300), said hardenable material being compressed between said positive printing master (310) and said remaining portion of said outer surface (305) of said embossing roll (300), whereby imprinting a pattern upon said second amount of hardenable material (350);

i. hardening said second amount of hardenable material (350); and, j. removing said positive printing master (310) completely from said first and said second amounts of hardened material, whereby exposing a final seamless negative master of hardened material firmly adhered to said outer surface (305) of said embossing roll (300).

2. The method according to claim 1 wherein said application, compression, and hardening of said first amount of hardenable material (320) and said second amount of hardenable material (350) result in a uniformly thick layer of hardened material circumjacent to said outer surface (305) of said embossing roll (300).

3. The method according to claim 1 wherein said first amount of hardenable material (320) is applied uniformly across the width of said positive printing master (310) near said trailing edge (312) of said positive printing master (310).

4. The method according to claim 1 wherein said second amount of hardenable material (350) is applied uniformly across the width of said positive printing master (310) near said leading edge (311) of said positive printing master (310).

5. The method according to claim 1 wherein said textured surface (315) of said positive printing master (310) is symmetric.

6. A method of creating a seamless printing master for use with an embossing roll, said method comprising the steps of:

a. applying a first amount of hardenable material (320) across the width of a positive printing master (310), said positive printing master (310) comprising a substrate having a textured surface (315), a leading edge (311), and a trailing edge (312);

b. positioning said embossing roll (300) across the width of said positive printing master (310) near said trailing edge (312) of said positive printing master (310);

c. imprinting the pattern of said textured surface (315) of said positive printing master (310) to said first amount of hardenable material (320) by rotating said embossing roll (300) along the length of said positive printing master (310) towards said leading edge (311) such that said first amount of hardenable material (320) is compressed between said textured surface (315) of said positive printing master (310) and the outer surface (305) of said embossing roll (300) until said positive printing master (310) and said first amount of hardenable material (320) cover approximately three-fourths of the circumference of said embossing roll (300);

d. hardening said first amount of hardenable material (320);

e. partially peeling back said positive printing master (310) away from said outer surface (305) of said embossing roll (300) such that a portion of said imprinted hardened material is exposed;

f. rotating said embossing roll (300) towards said trailing edge (312) of said positive printing master (310);

g. applying a second amount of hardenable material (320) across the width of said positive printing master (310) near said leading edge (311) of said positive printing master (310);

h. imprinting the pattern of said textured surface (315) of said positive printing master (310) to said second amount of hardenable material (320) by rotating said embossing roll (300) along the length of said positive printing master (310) towards said leading edge (311) such that said second amount of hardenable material (320) is compressed between said textured surface (315) of said positive printing master (310) and said outer surface (305) of said embossing roll (300) whereby covering the remaining uncovered portion of said outer surface (305) of said embossing roll (300);

i. hardening said second amount of hardenable material (350); and, j. removing said positive printing master (310) completely from said first and said second amounts of hardened material, whereby exposing a final seamless negative master of hardened material firmly adhered to said outer surface (305) of said embossing roll (300).

7. The method according to claim 6 wherein said application, compression, and hardening of said first amount of hardenable material (320) and said second amount of hardenable material (350) result in a uniformly thick layer of hardened material circumjacent to said outer surface (305) of said embossing roll (300).

8. The method according to claim 6 wherein said textured surface (315) of said positive printing master (310) is symmetric.

* * * * *